US012085031B2

(12) United States Patent
Sugimoto

(10) Patent No.: US 12,085,031 B2
(45) Date of Patent: Sep. 10, 2024

(54) CONTROLLER AND CONTROL METHOD FOR MULTI-CYLINDER INTERNAL COMBUSTION ENGINE

(71) Applicant: TOYOTA JIDOSHA KABUSHIKI KAISHA, Toyota (JP)

(72) Inventor: Hitoki Sugimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/523,534

(22) Filed: Nov. 10, 2021

(65) Prior Publication Data

US 2022/0195953 A1 Jun. 23, 2022

(30) Foreign Application Priority Data

Dec. 21, 2020 (JP) ................................ 2020-211814

(51) Int. Cl.

*F02D 41/00* (2006.01)
*F02D 41/14* (2006.01)
*F02D 41/18* (2006.01)
*F02D 41/22* (2006.01)

(52) U.S. Cl.

CPC ..... *F02D 41/0087* (2013.01); *F02D 41/1454* (2013.01); *F02D 41/182* (2013.01); *F02D 41/22* (2013.01)

(58) Field of Classification Search

CPC .. F02D 41/0087; F02D 41/1454; F02D 41/22; F02D 41/0082; F02D 41/1495; F02D 13/06; F02D 41/221; F02M 35/10045
USPC .......................................................... 123/481
See application file for complete search history.

(56) References Cited

U.S. PATENT DOCUMENTS 6,161,521 A * 12/2000 Russ ........................ F02D 13/06 123/347
2003/0110845 A1* 6/2003 Kumagai .............. F02D 41/221 73/114.74
2003/0221679 A1* 12/2003 Surnilla .............. F02D 41/2474 123/674
2004/0237514 A1* 12/2004 Surnilla ................ F01N 13/009 60/299

(Continued)

FOREIGN PATENT DOCUMENTS

JP 2004100486 A * 4/2004 ......... F02D 41/1498
JP 2013148011 A * 8/2013
JP 2018193973 A * 12/2018

*Primary Examiner* — Logan M Kraft
*Assistant Examiner* — Joshua Campbell
(74) *Attorney, Agent, or Firm* — Finnegan, Henderson, Farabow, Garrett & Dunner, LLP

(57) ABSTRACT

When an intake air amount is greater than or equal to the lower limit intake air amount and less than or equal to the upper limit intake air amount, a CPU sets, from the first cylinder group that increases a detection value of an upstream air-fuel ratio sensor, one of cylinders that has the smallest cutoff frequency, which is stored in a storage device, as a cylinder to which the supply of fuel will be cut off. Then, the CPU obtains the maximum value of an upstream air-fuel ratio as a maximum air-fuel ratio. When the maximum air-fuel ratio is greater than a determination value, the CPU determines that specific cylinder fuel cutoff control is normal. When the maximum air-fuel ratio is less than or equal to the determination value, the CPU determines that the specific cylinder fuel cutoff control is anomalous.

9 Claims, 5 Drawing Sheets

(56) References Cited

U.S. PATENT DOCUMENTS

| | | | | |
|---|---|---|---|---|
| 2015/0369180 | A1* | 12/2015 | Leone .................. | F02D 41/042<br>123/52.1 |
| 2016/0069286 | A1* | 3/2016 | Zielinski ................ | F02D 43/00<br>123/445 |

* cited by examiner

CONTROLLER AND CONTROL METHOD FOR MULTI-CYLINDER INTERNAL COMBUSTION ENGINE

BACKGROUND

1. Field

The following description relates to a controller and a control method for a multi-cylinder internal combustion engine.

2. Description of Related Art

Japanese Laid-Open Patent Publication No. 2004-100486 discloses a controller for a multi-cylinder internal combustion engine. The controller detects an operation anomaly in cylinder deactivation control, in which the supply of fuel to a cylinder that is subject to deactivation is cut off and the intake and exhaust valves of the cylinder are closed, based on an output value of an exhaust sensor arranged in an exhaust passage.

The inventor has conducted studies on how to supply oxygen to a catalyst arranged in an exhaust passage by cutting off the supply of fuel to some of the cylinders while continuing the supply of fuel to the remaining cylinders. The inventor has also conducted studies on how to detect an anomaly when a cylinder is being supplied with fuel even though the supply of fuel has been cut off by using an output value of an exhaust sensor arranged at the upstream side of the catalyst. In this case, the shape of the exhaust pipe and the relative position of the exhaust sensor and the cylinders may result in errors in the detection values of the exhaust gas from the cylinders obtained by the exhaust sensor. Thus, even when the supply of fuel is cut off in a normal manner, an anomaly determination may be given if the detection value of the exhaust sensor is low.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a multi-cylinder internal combustion engine is provided. The multi-cylinder internal combustion engine includes an exhaust sensor that detects oxygen and is arranged at an upstream side of a catalyst in an exhaust passage, a first cylinder group including one or more cylinders, and a second cylinder group including one or more cylinders. The controller includes an execution device. The multi-cylinder internal combustion engine is configured so that when at least an index value of an intake air amount is in a predetermined range, a detection value of the exhaust sensor for oxygen discharged from a cylinder included in the first cylinder group is greater than a detection value of the exhaust sensor for oxygen discharged from a cylinder included in the second cylinder group. The execution device is configured to perform a specific cylinder fuel cutoff process for performing specific cylinder fuel cutoff control to cut off a supply of fuel to one of cylinders of the multi-cylinder internal combustion engine and supply fuel to the cylinders other than the one cylinder. The execution device is configured to perform an anomaly determination process for determining whether a cutoff cylinder to which the supply of fuel is cut off is anomalous based on a detection value of the exhaust sensor. The specific cylinder fuel cutoff process includes a cutoff cylinder selection process for setting one cylinder of the first cylinder group as the cutoff cylinder.

In another general aspect, a controller for a multi-cylinder internal combustion engine is provided. The multi-cylinder internal combustion engine includes an exhaust sensor that detects oxygen and is arranged at an upstream side of a catalyst in an exhaust passage, a first cylinder group including one or more cylinders, a second cylinder group including one or more cylinders. The controller includes an execution device including circuitry. The multi-cylinder internal combustion engine is configured so that when at least an index value of an intake air amount is in a predetermined range, a detection value of the exhaust sensor for oxygen discharged from a cylinder included in the first cylinder group is greater than a detection value of the exhaust sensor for oxygen discharged from a cylinder included in the second cylinder group. The execution device is configured to perform a specific cylinder fuel cutoff process for performing specific cylinder fuel cutoff control to cut off a supply of fuel to one of cylinders of the multi-cylinder internal combustion engine and supply fuel to the cylinders other than the one cylinder. The execution device is configured to perform an anomaly determination process for determining whether a cutoff cylinder to which the supply of fuel is cut off is anomalous based on a detection value of the exhaust sensor. The specific cylinder fuel cutoff process includes a cutoff cylinder selection process for setting one cylinder of the first cylinder group as the cutoff cylinder.

In another general aspect, a method for controlling a multi-cylinder internal combustion engine is provided. The multi-cylinder internal combustion engine includes an exhaust sensor that detects oxygen and is arranged at an upstream side of a catalyst in an exhaust passage, a first cylinder group including one or more cylinders, a second cylinder group including one or more cylinders, and an execution device. The multi-cylinder internal combustion engine is configured so that when at least an index value of an intake air amount is in a predetermined range, a detection value of the exhaust sensor for oxygen discharged from a cylinder included in the first cylinder group is greater than a detection value of the exhaust sensor for oxygen discharged from a cylinder included in the second cylinder group. The method includes performing a specific cylinder fuel cutoff process for performing specific cylinder fuel cutoff control to cut off a supply of fuel to one of cylinders of the multi-cylinder internal combustion engine and supply fuel to the cylinders other than the one cylinder; and performing an anomaly determination process for determining whether a cutoff cylinder to which the supply of fuel is cut off is anomalous based on a detection value of the exhaust sensor. The specific cylinder fuel cutoff process includes a cutoff cylinder selection process for setting one cylinder of the first cylinder group as the cutoff cylinder.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A controller for an internal combustion engine 10 according to a first embodiment will now be described with reference to FIGS. 1 to 4.

Figure 1:
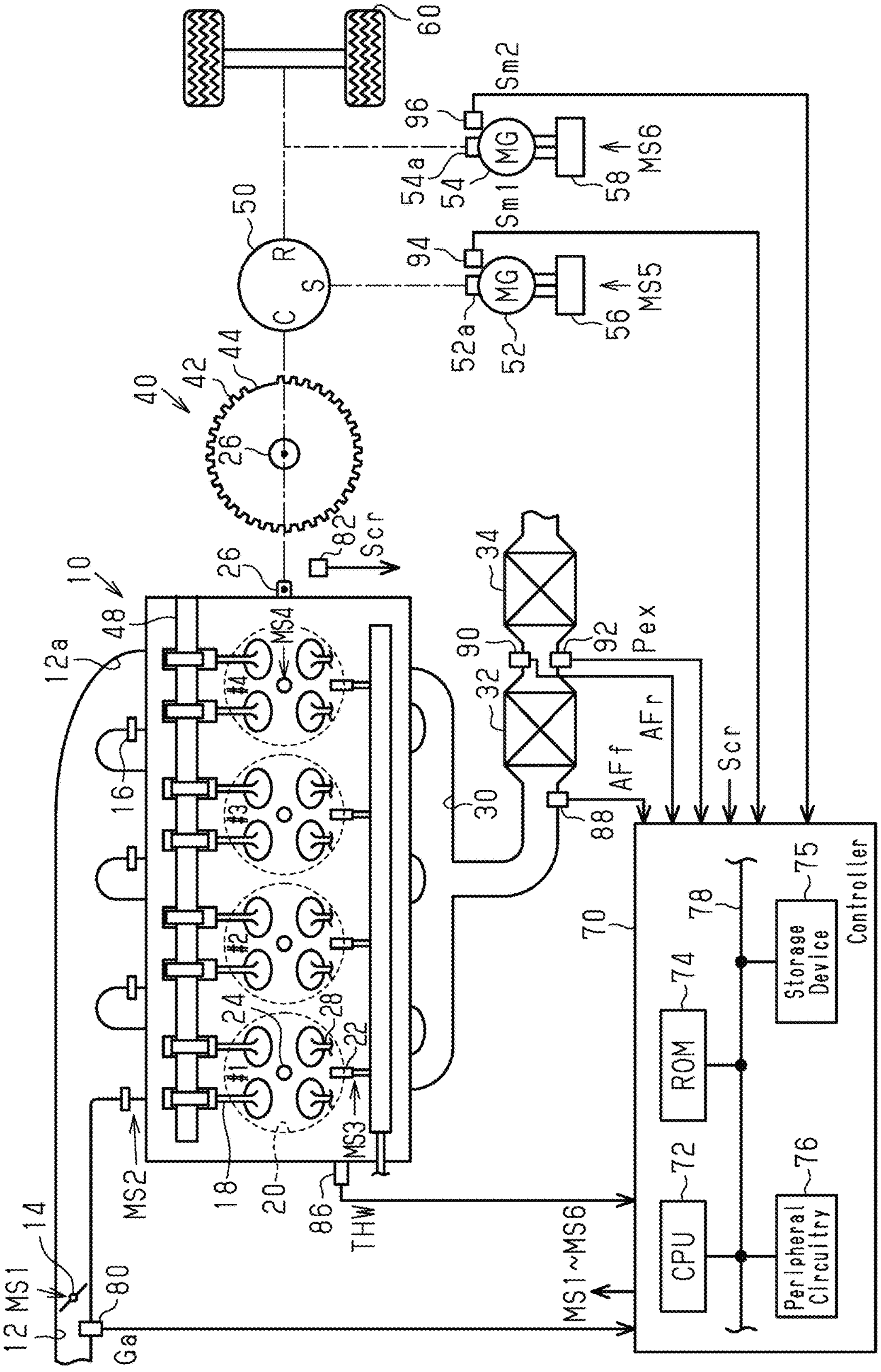
FIG. 1 is a diagram showing a drive system and its control system according to a first embodiment.

FIG. 1 shows a drive system and its control system of the first embodiment. As shown in FIG. 1, the internal combustion engine 10 includes four cylinders, namely, cylinder 41 to cylinder 44. An intake passage 12 arranged at the upstream side of the internal combustion engine 10 includes a throttle valve 14. The downstream portion of the intake passage 12 is branched and connected to the cylinders. The portion branched and connected to the cylinders forms intake ports 12*a*, each including a port injection valve 16 that supplies fuel. The air drawn into the intake passage 12 and the fuel supplied from the port injection valves 16 enter combustion chambers 20 when intake valves 18 open. The combustion chambers 20 are also supplied with fuel from direct injection valves 22. The air and fuel, drawn into the combustion chambers 20, and the fuel, supplied from the direct injection valves 22, form an air-fuel mixture that is burned when ignited by spark discharges of spark plugs 24 arranged in the combustion chambers 20. The generated combustion energy is converted into rotational energy of a crankshaft 26.

The air-fuel mixture burned in the combustion chambers 20 is discharged to an exhaust passage 30 as exhaust gas when the exhaust valves 28 open. The exhaust passage 30 includes a three-way catalyst 32 that occludes oxygen and has a gasoline particulate filter (GPF) 34. The GPF 34 in the present embodiment includes a three-way catalyst carried on a filter that collects particulate matter (PM) from exhaust gas.

The crankshaft 26 is coupled to a crank rotor 40 including teeth 42. The crank rotor 40 includes the teeth 42 at 10° CA intervals and a toothless portion 44 in which a 30° CA interval is provided between adjacent teeth 42. This indicates a reference rotation angle of the crankshaft 26.

The crankshaft 26 is mechanically connected to a carrier C of a planetary gear mechanism 50 that forms a power split mechanism. A sun gear S of the planetary gear mechanism 50 is mechanically connected to a rotary shaft 52*a* of a first motor generator 52. A ring gear R of the planetary gear mechanism 50 is mechanically connected to a rotary shaft 54*a* of a second motor generator 54 and drive wheels 60. A first inverter 56 applies alternating voltage to a terminal of the first motor generator 52. A second inverter 58 applies alternating voltage to a terminal of the second motor generator 54.

A controller 70 executes control on the internal combustion engine 10 and controls a control quantity, such as torque or ratio of exhaust gas components, by operating operation parts of the internal combustion engine 10 such as the throttle valve 14, the port injection valves 16, the direct injection valves 22, the spark plugs 24. The controller 70 further executes control on the first motor generator 52 and controls a rotation speed as a control quantity by operating the first inverter 56. The controller 70 further executes control on the second motor generator 54 and controls torque as a control quantity by operating the second inverter 58. FIG. 1 shows operation signals MS1 to MS6 of the throttle valve 14, the port injection valves 16, the direct injection valves 22, the spark plugs 24, and the inverters 56, 58, respectively. The controller 70 controls the control quantities of the internal combustion engine 10 by referring to an intake air amount Ga detected by an air flowmeter 80, an output signal Scr of a crank angle sensor 82, a coolant temperature THW detected by a coolant temperature sensor 86, an upstream air-fuel ratio AFf detected by an upstream air-fuel ratio sensor 88 at the upstream side of the three-way catalyst 32, a downstream air-fuel ratio AFr detected by a downstream air-fuel ratio sensor 90 at the downstream side of the three-way catalyst 32, and an exhaust pressure Pex of exhaust gas detected by an exhaust pressure sensor 92 when the exhaust gas enters the GPF 34. The controller 70 also controls the control quantities of the first motor generator 52 and the second motor generator 54 by referring to an output signal Sm1 of a first rotation angle sensor 94 that detects the rotation angle of the first motor generator 52 and an output signal Sm2 of a second rotation angle sensor 96 that detects the rotation angle of the second motor generator 54.

The controller 70 includes a CPU 72, a ROM 74, a storage device 75, and peripheral circuitry 76, which are allowed for communication by a communication line 78. The peripheral circuitry 76 includes a circuit that generates clock signals for synchronizing inner operations, a power supply circuit, a reset circuit, and the like. The controller 70 controls the control quantities by executing a program stored in the ROM 74 with the CPU 72.

Figure 2:
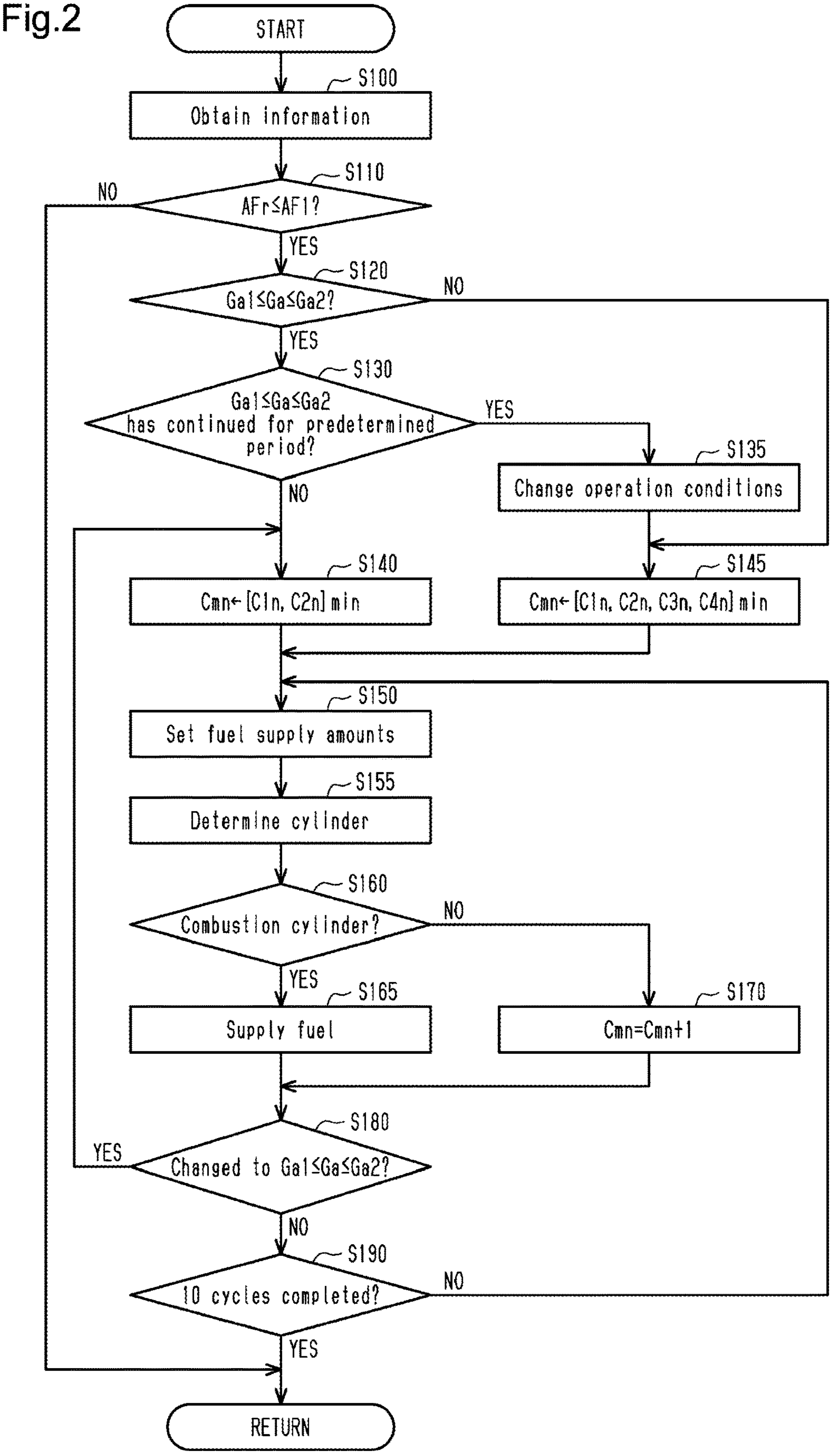
FIG. 2 is a flowchart showing the procedures of specific cylinder fuel cutoff control.

FIG. 2 shows the procedures of a process executed by the controller 70 in the first embodiment. The process shown in FIG. 2 is implemented by having the CPU 72 repeatedly execute the program stored in the ROM 74 in, for example, predetermined cycles. In the following description, the step number of each process starts with the letter "S."

In the process shown in FIG. 2, the CPU 72 obtains a rotation speed NE, a charging efficiency $\eta$, the output signal Scr, the downstream air-fuel ratio AFr, and the intake air amount Ga (S100). The rotation speed NE is calculated by the CPU 72 from the output signal Scr. The charging efficiency η is calculated by the CPU 72 from the intake air amount Ga and the rotation speed NE. Then, the CPU 72 compares the obtained downstream air-fuel ratio AFr with a specific cylinder fuel cutoff execution value AF1 (S110). When the downstream air-fuel ratio AFr is greater than the specific cylinder fuel cutoff execution value AF1 (S110: NO), the CPU 72 ends the process shown in FIG. 2 without performing specific cylinder fuel cutoff control. In other words, when the air-fuel ratio is greater than the specific cylinder fuel cutoff execution value AF1, the CPU 72 determines that the air-fuel ratio is lean and the three-way catalyst 32 is not required to be supplied with oxygen. Thus, the CPU 72 does not perform the specific cylinder fuel cutoff control. When the downstream air-fuel ratio AFr is less than or equal to the specific cylinder fuel cutoff execution value AF1 (S110: YES), the CPU 72 determines whether the intake air amount Ga is in a range that is greater than or equal to a lower limit intake air amount Ga1 and less than or equal to an upper limit intake air amount Ga2 (S120).

When the intake air amount Ga is greater than or equal to the lower limit intake air amount Ga1 and less than or equal to the upper limit intake air amount Ga2 (S120: YES), the CPU 72 determines whether the state in which the intake air amount Ga is greater than or equal to the lower limit intake air amount Ga1 and less than or equal to the upper limit intake air amount Ga2 has been continuing for a predetermined period (S130). When the state in which the intake air amount Ga is greater than or equal to the lower limit intake air amount Ga1 and less than or equal to upper limit intake air amount Ga2 has not been continuing for the predetermined period (S130: NO), the CPU 72 sets one of the cylinders in a first cylinder group that has the smallest cutoff frequency Cmn (m=1, 2), which is stored in the storage device 75 (described below), as the cylinder to which the supply of fuel will be cut off (S140). When the intake air amount Ga is not greater than or equal to the lower limit intake air amount Ga1 and less than or equal to the upper limit intake air amount Ga2 (S120: NO), the CPU 72 sets the one of cylinder 41 to cylinder 44 that has the smallest cutoff frequency Cmn (m=1 to 4) as the cylinder to which the supply of fuel will be cut off while continuing ignition (S145). When the state in which the intake air amount Ga is greater than or equal to the lower limit intake air amount Ga1 and less than or equal to upper limit intake air amount Ga2 has been continuing for the predetermined period (S130: YES), the CPU 72 controls the first motor generator 52 and the second motor generator 54 to change operation conditions of the internal combustion engine 10 so that the intake air amount Ga will not be greater than or equal to the lower limit intake air amount Ga1 and less than or equal to the upper limit intake air amount Ga2 (S135). Then, the CPU 72 sets the one of cylinder 41 to cylinder 44 that has the smallest cutoff frequency Cmn (m=1 to 4) as the cylinder to which the supply of fuel will be cut off while continuing ignition (S145). Hereafter, the cutoff of the fuel supply will be referred to as fuel cutoff (F/C), the cylinder to which the supply of fuel is cut off will be referred to as a cutoff cylinder, and the cylinder to which the supply of fuel supply continues will be referred to as a combustion cylinder. In the cutoff frequency Cmn, m and n indicate that cylinder #m has undergone a cutoff an n number of times. The first cylinder group includes the ones of cylinder #1 to cylinder #4 of which the exhaust gas detection values obtained by the upstream air-fuel ratio sensor 88 are large, the exhaust gas detection values being greater than or equal to the lower limit intake air amount Ga1 and less than or equal to the upper limit intake air amount Ga2. In the present example, cylinder #1 and cylinder #2 correspond to the first cylinder group, and cylinder #3 and cylinder #4 that have smaller detection values of the upstream air-fuel ratio sensor 88 than cylinder #1 and cylinder #2 correspond to the second cylinder group.

After S140 and S145, the CPU 72 sets fuel supply amounts for cylinder #1 to cylinder #4 based on an engine torque instruction value Te*, which is an instruction value of torque for the internal combustion engine 10 (S150). In S150, the CPU 72 sets the fuel supply amount of the cutoff cylinder (for example, cylinder #1), which is selected from cylinder #1 to cylinder #4, to zero and sets the fuel supply amounts of the remaining cylinders (for example, cylinder #2, cylinder #3, and cylinder #4) so that the air-fuel ratio will be the stoichiometric value.

The CPU 72 determines from the output signal Scr the one of the cylinders where it is time to start supplying fuel (S155). Following the determination of step S155, when it is time to start supplying one of the combustion cylinders (cylinder #2, cylinder 43 or cylinder #4) with fuel (S160: YES), the CPU 72 supplies the combustion cylinder with the amount of fuel set in S150 from the corresponding port injection valve 16 and direct injection valve 22 (S165). Following the determination of step S155, when it is time to start supplying the cutoff cylinder (cylinder #1) with fuel (S160: NO), the CPU 72 cuts off the supply of fuel from the corresponding port injection valve 16 and direct injection valve 22 and substitutes cutoff frequency C1*n*+1 for cutoff frequency C1*n*. The cutoff frequency C1*n*+1 is stored in the storage device 75 (S170). While the supply of fuel to the cutoff cylinder (cylinder #1) is cut off, the intake valve 18 and the exhaust valve 28 of the cutoff cylinder open and close in the same manner as when fuel is supplied.

After S165 and S170, the CPU 72 determines whether the state in which the intake air amount Ga is not greater than or equal to the lower limit intake air amount Ga1 and less than or equal to the upper limit intake air amount Ga2 (S120: NO) has changed to a state in which the intake air amount Ga is greater than or equal to the lower limit intake air amount Ga1 and less than or equal to the upper limit intake air amount Ga2 (S180). When the state in which the intake air amount Ga is not greater than or equal to the lower limit intake air amount Ga1 and less than or equal to the upper limit intake air amount Ga2 (S120: NO) has changed to the state greater than or equal to the lower limit intake air amount Ga1 and less than or equal to the upper limit intake air amount Ga2, (S180: YES), the CPU 72 sets the one of the cylinders in the first cylinder group that has the smallest cutoff frequency Cmn (m=1, 2), which is stored in the storage device 75, as the cylinder to which the supply of fuel will be cut off (S140). When the state in which the intake air amount Ga is not greater than or equal to the lower limit intake air amount Ga1 and less than or equal to the upper limit intake air amount Ga2 (S120: NO) remains unchanged (S180: NO), or the intake air amount Ga in S120 is greater than or equal to the lower limit intake air amount Ga1 and less than or equal to the upper limit intake air amount Ga2, (S180: NO), the CPU 72 determines whether ten fuel supply cycles have been completed during twenty rotations of the internal combustion engine 10 (S190).

When ten fuel supply cycles have not been completed (S190: NO), the CPU 72 repeatedly performs S150 to S180. When ten fuel supply cycles have been completed (S190: YES), the CPU 72 ends the process shown in FIG. 2.

Figure 3:
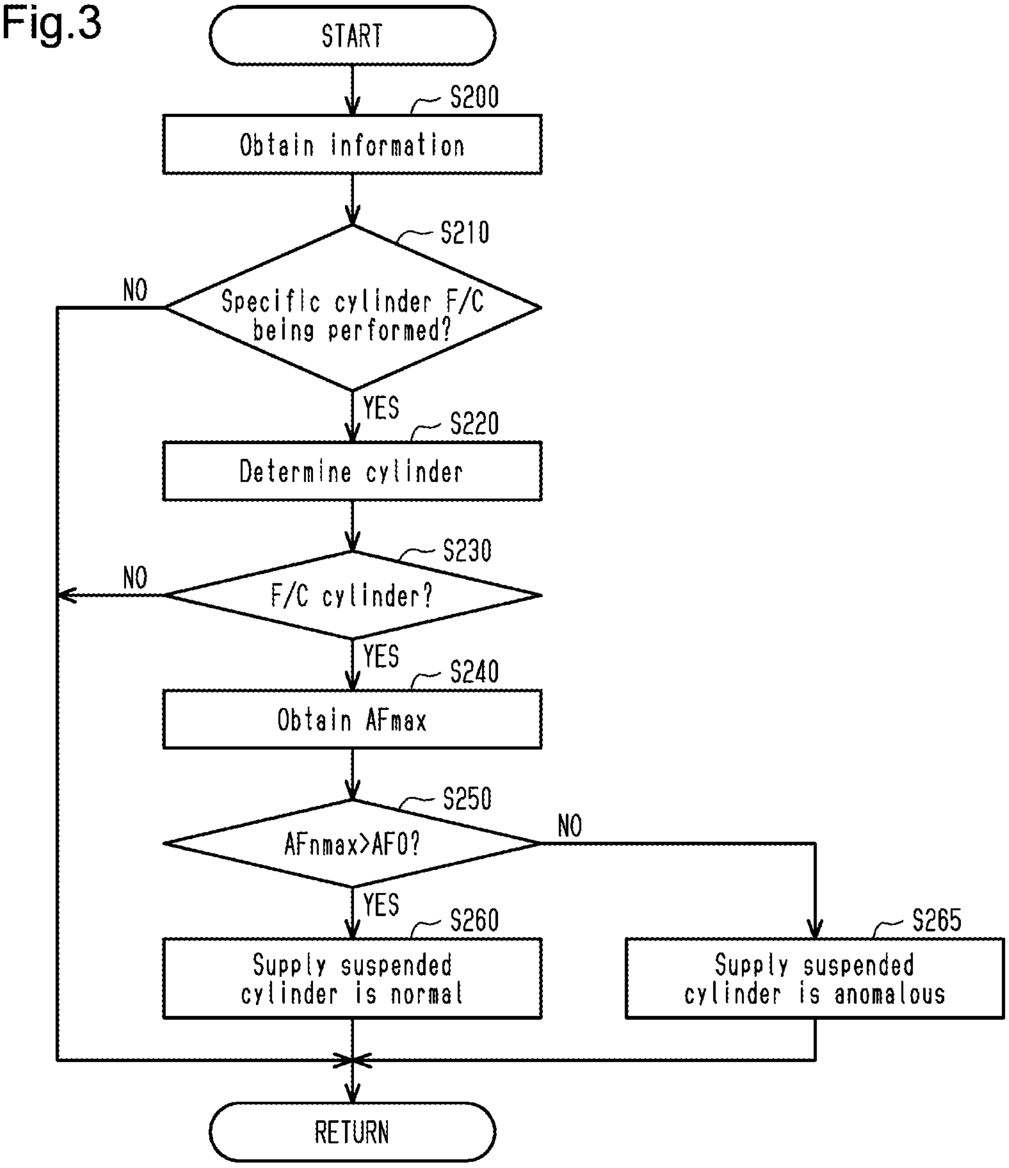
FIG. 3 is a flowchart showing anomaly detection procedures of specific cylinder fuel cutoff control.

FIG. 3 is a flowchart showing another procedure of a process executed by the controller 70. The process shown in FIG. 3 is implemented by repeatedly executing a program stored in the ROM 74 whenever fuel cutoff is performed.

In the process shown in FIG. 3, the CPU 72 obtains the output signal Scr and the upstream air-fuel ratio AFf (S200). The CPU 72 determines whether specific cylinder fuel cutoff control is being performed (S210). When the specific cylinder fuel cutoff is being performed (S210: YES), the CPU 72 determines the cylinder where it is time to open the exhaust valve 28 from the output signal Scr (S220). When it is time for the exhaust valve 28 of the cutoff cylinder (cylinder #1) to open (S230: YES), the CPU 72 obtains a maximum air-fuel ratio AFmax, which is the maximum value of the upstream air-fuel ratio AFf described below (S240).

The CPU 72 compares the obtained maximum air-fuel ratio AFmax with a preset determination value AF0 (S250). When the maximum air-fuel ratio AFmax is greater than the determination value AF0 (S250: YES), the CPU 72 determines that the specific cylinder fuel cutoff control is normal (S260) and ends the process shown in FIG. 3. When the maximum air-fuel ratio AFmax is less than or equal to the determination value AF0 (S250: NO), the CPU 72 determines that the specific cylinder fuel cutoff control is anomalous (S265) and ends the process shown in FIG. 3. In other words, when the maximum air-fuel ratio AFmax of the exhaust gas from the cutoff cylinder is leaner than the determination value AF0, the CPU 72 determines that the specific cylinder fuel cutoff control is performed normally because the cutoff cylinder is undergoing fuel cutoff properly. When the maximum air-fuel ratio AFmax of the exhaust gas from the cutoff cylinder is equal to or richer than the determination value AF0 the CPU 72 determines that the specific cylinder fuel cutoff control is anomalous because the cutoff cylinder is not undergoing fuel cutoff properly. The determination value AF0 is set to an air-fuel ratio so that anomalous specific cylinder fuel cutoff control will not be erroneously determined as being normal.

When the specific cylinder fuel cutoff control is not being performed (S210: NO) or when determined that it is not the time for the exhaust valve 28 of the cutoff cylinder (cylinder #1) to open (S230: NO), the CPU 72 ends the process shown in FIG. 3.

Figure 4:
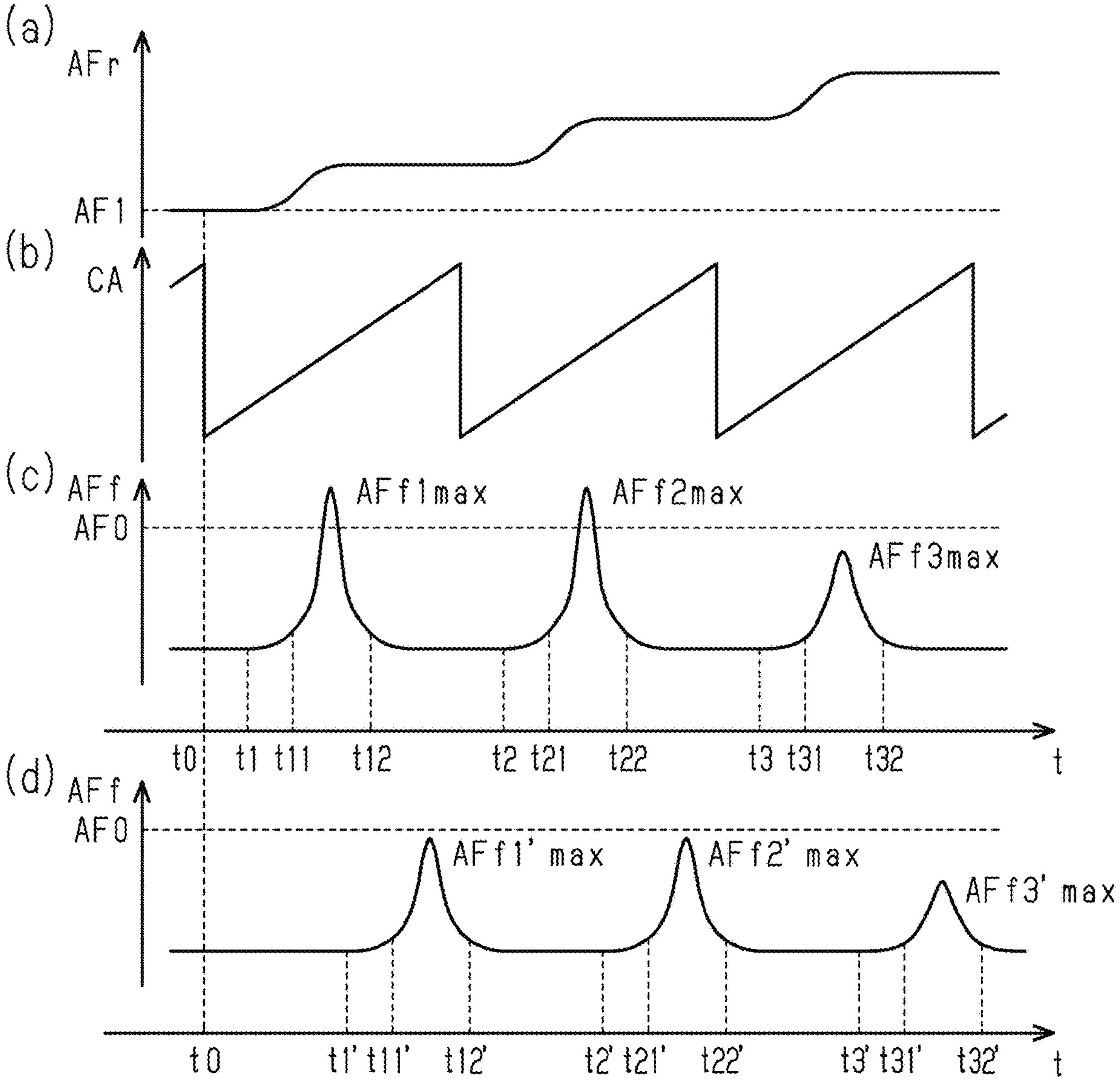
FIG. 4 is a diagram showing detection values of various types of sensors with the horizontal axis indicating time, in which Section (a) indicates detection values of a downstream air-fuel ratio, Section (b) indicates a crank angle calculated based on an output signal, Section (c) indicates the detection values of an upstream air-fuel ratio when a cylinder included in a first cylinder group is a cutoff cylinder, and Section (d) indicates detection values of an upstream air-fuel ratio when a cylinder included in a second cylinder group is a cutoff cylinder.

FIG. 4 is a diagram showing detection values of various sensors with the horizontal axis indicating time. Section (a) of FIG. 4 indicates the detection values of the downstream air-fuel ratio AFr, Section (b) of FIG. 4 indicates the crank angle calculated based on the output signal Scr, Section (c) of FIG. 4 indicates the detection values of the upstream air-fuel ratio AFf when cylinder #1 included in the first cylinder group is set as the cutoff cylinder, and Section (d) of FIG. 4 indicates the detection values of the upstream air-fuel ratio AFf when cylinder #3 included in the second cylinder group is the cutoff cylinder. First, a case will be described in which cylinder #1 included in the first cylinder group is set as the cutoff cylinder when the intake air amount Ga is greater than or equal to the lower limit intake air amount Ga1 and less than or equal to the upper limit intake air amount Ga2. In this example, fuel cutoff is performed normally from the start of the specific cylinder fuel cutoff control until the second cycle. In the third cycle, fuel cutoff is not performed normally and cylinder #1, which is the cutoff cylinder, is supplied with a relatively small amount of fuel. At t=t0, the downstream air-fuel ratio AFr is less than or equal to the specific cylinder fuel cutoff execution value AF1, cylinder #1 is set as the cutoff cylinder, and the specific cylinder fuel cutoff control starts. At t=t1, the exhaust valve 28 of cylinder #1 opens. In this case, since the upstream air-fuel ratio sensor 88 is arranged at the downstream side of the combustion chamber 20, oxygen sent from the cutoff cylinder is detected by the upstream air-fuel ratio sensor 88 after a predetermined delay. Thus, in the first cycle of the specific cylinder fuel cutoff control, the CPU 72 obtains a maximum value AFf1max of the upstream air-fuel ratio AFf as the maximum air-fuel ratio AFmax after time t0 at which the exhaust valve 28 of the cutoff cylinder opens when a first predetermined period t11 elapses until a second predetermined period t12 elapses. The CPU 72 compares the maximum value AFf1max with the determination value AF0. The maximum value AFf1max is greater than the determination value AF0, and the specific cylinder fuel cutoff control in the first cycle is determined as being normal in S250 of FIG. 3. In the same manner, in the second cycle of the specific cylinder fuel cutoff control, the CPU 72 obtains a maximum value AFf2max of the upstream air-fuel ratio AFf as the maximum air-fuel ratio AFmax after time t2 at which the exhaust valve 28 of the cutoff cylinder opens when a first predetermined period t21 elapses until a second predetermined period t22 elapses. The CPU 72 compares the maximum value AFf2max with the determination value AF0. The maximum value AFf2max is greater than the determination value AF0, and the specific cylinder fuel cutoff is determined as being normal until the second cycle of the specific cylinder fuel cutoff. However, the maximum value AF3max of the upstream air-fuel ratio AFf in the third cycle of the specific cylinder fuel cutoff control is less than the determination value AF0. Thus, the specific cylinder fuel cutoff in the third cycle is determined as being anomalous. This allows for accurate determination of an anomaly in which fuel is supplied to the cutoff cylinder after the specific cylinder fuel cutoff control starts. In this case, the engine rotation speed NE and the intake air amount Ga varies the time at which the upstream air-fuel ratio reaches a peak value varies relative to a time at which the exhaust valve 28 of the cutoff cylinder opens. Thus, the first predetermined period and the second predetermined period are set based on the engine rotation speed NE and the intake air amount Ga to include the peak value of the upstream air-fuel ratio.

Next, a case will be described in which cylinder #3 included in the second cylinder group is set as the cutoff cylinder when the intake air amount Ga is greater than or equal to the lower limit intake air amount Ga1 and less than or equal to the upper limit intake air amount Gat. In this example, fuel cutoff is performed normally from the start of the specific cylinder fuel cutoff control until the second cycle. In the third cycle, fuel cutoff is not performed normally and cylinder #3, which is the cutoff cylinder, is supplied with a relatively small amount of fuel. At t=t0, the downstream air-fuel ratio AFr is less than or equal to the specific cylinder fuel cutoff execution value AF1, cylinder #3 is set as the cutoff cylinder, and the specific cylinder fuel cutoff control starts. In the first cycle of the specific cylinder fuel cutoff control, the CPU 72 obtains a maximum value AFf1'max of the upstream air-fuel ratio AFf as the maximum air-fuel ratio AFmax after time t1' at which the exhaust valve 28 of the cutoff cylinder opens when a first predetermined period t11' elapses until a second predetermined period t12' elapses. The CPU 72 compares the maximum value AFf1'max with the determination value AF0. The maximum value AFf1'max is less than the determination value AF0, and the specific cylinder fuel cutoff control in the first cycle is determined as being anomalous in S250 of FIG. 3. In the same manner, in the second cycle of the specific cylinder fuel cutoff control, the CPU 72 obtains a maximum value AFf2'max of the upstream air-fuel ratio AFf as the maximum air-fuel ratio AFmax after time t2' at which the exhaust valve 28 of the cutoff cylinder opens when a first predetermined period t21' elapses until a second predetermined period t22' elapses. The CPU 72 compares the maximum value AFf2'max with the determination value AF0. The maximum value AFf2'max is less than the determination value AF0, and the specific cylinder fuel cutoff control in the second cycle is determined as being anomalous. Further, a maximum value AF3'max of the upstream air-fuel ratio AFf in the third cycle of the specific cylinder fuel cutoff control is less than the determination value AF0. Thus, the specific cylinder fuel cutoff in the third cycle is determined as being anomalous. Thus, although the suspension of fuel supply is normally performed until the second cycle of the specific cylinder fuel cutoff control, an anomaly determination is given because of the low detection value of the exhaust sensor. As described above, the present example described avoids an anomaly determination that would result from a low detection value of the exhaust sensor even though the fuel cutoff is being performed normally. Thus, when the intake air amount Ga is greater than or equal to the lower limit intake air amount Ga1 and less than or equal to the upper limit intake air amount Ga2, the cutoff cylinder is selected from the cylinders included in the first cylinder group that increase the detection value of the upstream air-fuel ratio sensor 88.

The operation and advantages of the present embodiment will now be described.

When the downstream air-fuel ratio AFr is less than or equal to the specific cylinder fuel cutoff execution value AF1 the CPU 72 performs the specific cylinder fuel cutoff control. Thus, air drawn during an intake stroke into cylinder #1 flows out of cylinder #1 during an exhaust stroke to the exhaust passage without being used for combustion. The air-fuel mixture in cylinder #2 to cylinder #4 is burned at the stoichiometric air-fuel ratio. Thus, when the three-way catalyst 32 is in a rich state, oxygen is supplied to the three-way catalyst 32 without emitting Nox that would be caused by lean combustion. Thus, the three-way catalyst 32 will be in a lean state.

When the intake air amount Ga is greater than or equal to the lower limit intake air amount Ga1 and less than or equal to the upper limit intake air amount Ga2, the CPU 72 sets the one of the cylinders in the first cylinder group that has the smallest cutoff frequency Cmn (m=1, 2) as the cutoff cylinder. This reduces differences in the fuel cutoff frequency between the cylinders included in the first cylinder group.

Further, the upstream air-fuel ratio sensor 88 obtains a higher detection value from the cylinders included in the first cylinder group than the cylinders included in the second cylinder group, the higher detection value being greater than or equal to the lower limit intake air amount Ga1 and less than or equal to the upper limit intake air amount Ga2. Thus, by setting a cylinder that increases the exhaust gas detection value of the upstream air-fuel ratio sensor 88 as the cutoff cylinder when the intake air amount is greater than or equal to the lower limit intake air amount Ga1 and less than or equal to the upper limit intake air amount Ga2, the possibility will be reduced of the specific cylinder fuel cutoff control being determined as being anomalous even though fuel cutoff is being performed normally.

When the intake air amount Ga is not greater than or equal to the lower limit intake air amount Ga1 and less than or equal to the upper limit intake air amount Ga2, the CPU 72 sets the one of the cylinders that has the smallest cutoff frequency Cmn (m=1 to 4) as the cutoff cylinder. This reduces differences between cylinders in the number of times fuel is supplied.

The present embodiment described above further has the following operation and advantages.

(1) The detection value of the upstream air-fuel ratio sensor 88 is in accordance with the intake air amount Ga. Thus, the condition for selecting the cutoff cylinder is based on the intake air amount Ga. When the intake air amount is greater than or equal to the lower limit intake air amount Ga1 and less than or equal to the upper limit intake air amount Ga2, the one of the cylinders in the first cylinder group that has the smallest cutoff frequency Cmn (m=1, 2) is selected as the cutoff cylinder. This reduces the possibility of specific cylinder fuel cutoff control being determined as being anomalous even though fuel supply is cut off normally.

(2) When a state in which the intake air amount Ga is greater than or equal to the lower limit intake air amount Ga1 and less than or equal to upper limit intake air amount Ga2 continues over the predetermined period, the CPU 72 controls the first motor generator 52 and the second motor generator 54 to change operation conditions of the internal combustion engine 10 so that the intake air amount Ga becomes less than the lower limit intake air amount Ga1 or greater than the upper limit intake air amount Ga2. This avoids the selection of only cylinders in the first cylinder group as the cutoff cylinder and reduces differences in the cutoff frequency between cylinders.

Second Embodiment

A second embodiment will now be described with reference to FIG. 5. The description will focus on differences from the first embodiment.

In the second embodiment, a fuel supplied frequency C'mn is used to select the cutoff cylinder. Specifically, the one of the cylinders that has the largest fuel supplied frequency C'mn is set as the cutoff cylinder.

Figure 5:
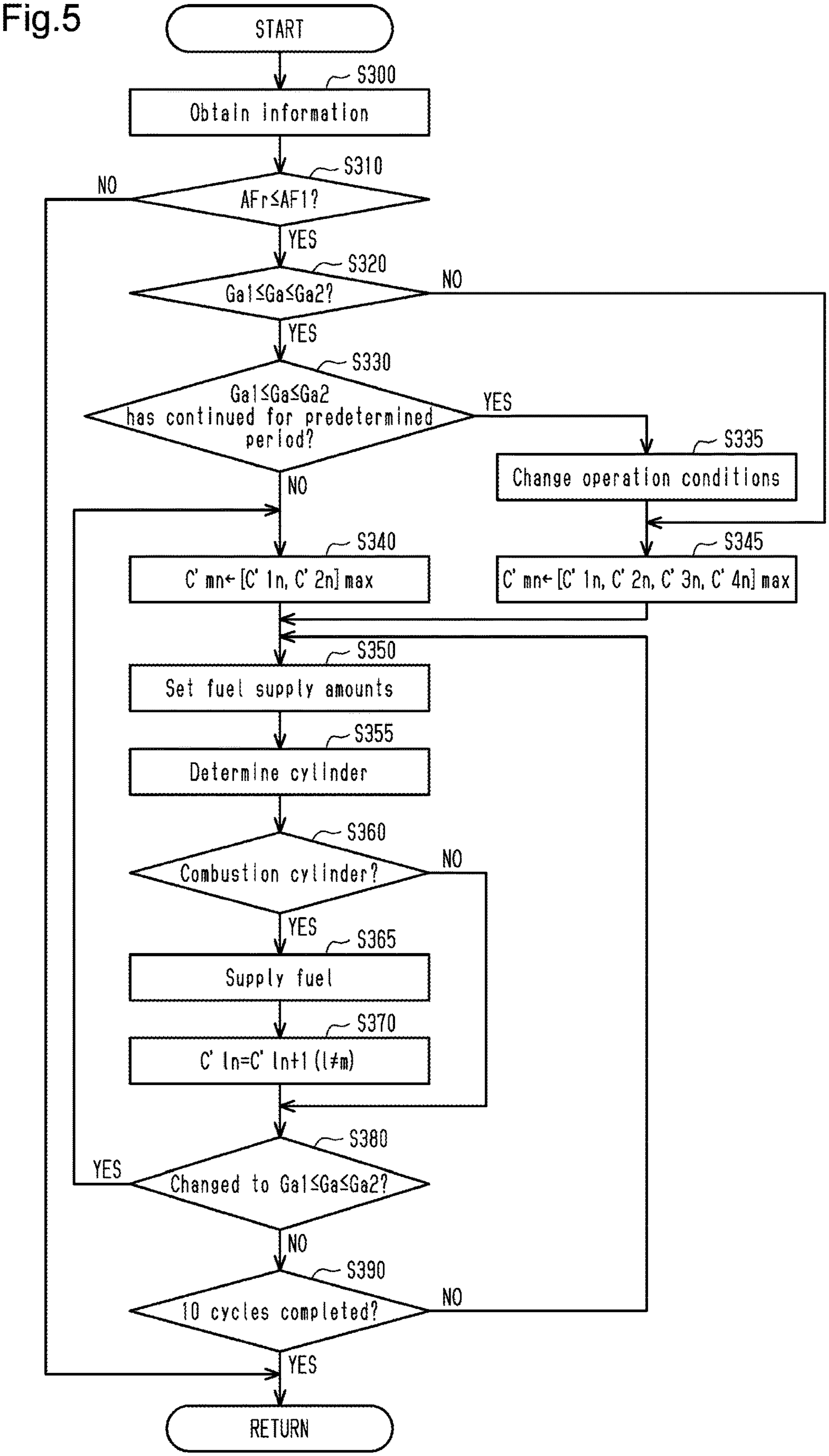
FIG. 5 is a flowchart showing the procedures of specific cylinder fuel cutoff control according to a second embodiment.

FIG. 5 shows the process executed by the controller 70 of the second embodiment. The process shown in FIG. 5 is implemented by having the CPU 72 repeatedly execute a program stored in the ROM 74 in, for example, predetermined cycles.

In the process shown in FIG. 5, the CPU 72 obtains the rotation speed NE, the charging efficiency $\eta$, the output signal Scr, the downstream air-fuel ratio AFr, and the intake air amount Ga (S300). The rotation speed NE is calculated by the CPU 72 from the output signal Scr. The charging efficiency $\eta$ is calculated by the CPU 72 from the intake air amount Ga and the rotation speed NE. Then, the CPU 72 compares the obtained downstream air-fuel ratio AFr with the specific cylinder fuel cutoff execution value AF1 (S310). When the downstream air-fuel ratio AFr is greater than the specific cylinder fuel cutoff execution value AF1 (S310: NO), the CPU 72 ends the process shown in FIG. 5 without performing the specific cylinder fuel cutoff control. When the downstream air-fuel ratio AFr is less than or equal to the specific cylinder fuel cutoff execution value AF1 (S310: YES), the CPU 72 determines whether the intake air amount Ga is greater than or equal to the lower limit intake air amount Ga1 and less than or equal to the upper limit intake air amount Ga2 (S320).

When the intake air amount Ga is greater than or equal to the lower limit intake air amount Ga1 and less than or equal to the upper limit intake air amount Ga2 (S320: YES), the CPU 72 determines whether a state in which the intake air amount Ga is greater than or equal to the lower limit intake air amount Ga1 and less than or equal to the upper limit intake air amount Ga2 has been continuing for a predetermined period (S330). When the state in which the intake air amount Ga is greater than or equal to the lower limit intake air amount Ga1 and less than or equal to upper limit intake air amount Ga2 has not been continuing for the predetermined period (S330: NO), the CPU 72 sets the one of the cylinders in the first cylinder group that has the largest fuel supplied frequency C'mn (m=1, 2), which is stored in the storage device 75 described below, as the cylinder to which the supply of fuel will be cut off (S340). When the intake air amount Ga is not greater than or equal to the lower limit intake air amount Ga1 and less than or equal to the upper limit intake air amount Ga2 (S320: NO), the CPU 72 sets the one of cylinder #1 to cylinder #4 that has the largest fuel supplied frequency C'mn (m=1 to 4) as the cylinder to which the supply of fuel supply will be cut off while continuing ignition (S345). When the state in which the intake air amount Ga is greater than or equal to the lower limit intake air amount Ga1 and less than or equal to upper limit intake air amount Ga2 has been continuing for the predetermined period (S330: YES), the CPU 72 controls the first motor generator 52 and the second motor generator 54 to change operation conditions of the internal combustion engine 10 so that the intake air amount Ga will not be greater than or equal to the lower limit intake air amount Ga1 and less than or equal to the upper limit intake air amount Ga2 (S335). Then, the CPU 72 sets the one of cylinder #1 to cylinder #4 that has the largest fuel supplied frequency C'mn (m=1 to 4) as the cylinder to which the supply of fuel will be cut off while continuing ignition (S345). In the fuel supplied frequency C'mn, m and n indicate that cylinder #m has been supplied with fuel an n number of times.

After S340 and S345, the CPU 72 sets fuel supply amounts for cylinder #1 to cylinder #4 based on the engine torque instruction value Te*, which is an instruction value of torque for the internal combustion engine 10 (S350). In S350, the CPU 72 sets the fuel supply amount of the cutoff cylinder (for example, cylinder #1), which is selected from cylinder #1 to cylinder #4, to zero and sets the fuel supply amounts of the remaining cylinders (for example, cylinder #2, cylinder #3, and cylinder #4) so that the air-fuel ratio will be the stoichiometric value.

The CPU 72 determines from the output signal Scr the one of the cylinders where it is time to start supplying fuel (S355). Following the determination of step S355, when it is time to start supplying one of the combustion cylinders (cylinder #2, cylinder #3, or cylinder #4) with fuel (S360: YES), the CPU 72 supplies the combustion cylinder with the amount of fuel set in S350 from the corresponding port injection valve 16 and direct injection valve 22 (S365) and substitutes fuel supplied frequency C'mn+1 (m=2 to 4) for fuel supplied frequency C'mn (m=2 to 4). The fuel supplied frequency C'mn+1 is stored in the storage device 75 (S370). In this case, when it is time to start supplying fuel to cylinder #4, for m=4, the CPU 72 substitutes fuel supplied frequency C'4*n*+1 for fuel supplied frequency C'4*n*. Following the determination of step S355, when determining that it is time to start supplying the cutoff cylinder (cylinder #1) with fuel (S360: NO), the CPU 72 cuts off the supply of fuel from the corresponding port injection valve 16 and direct injection valve 22 of the cylinder. While the supply of fuel to the cutoff cylinder (cylinder #1) is cut off, the intake valve 18 and the exhaust valve 28 of the cutoff cylinder open and close in the same manner as when fuel is supplied.

The CPU 72 determines whether the state in which the intake air amount Ga is less than the lower limit intake air amount Ga1 or greater than the upper limit intake air amount Ga2 (S320: NO) has changed to a state in which the intake air amount Ga is greater than or equal to the lower limit intake air amount Ga1 and less than or equal to the upper limit intake air amount Ga2 (S380). Further, after S370, the CPU 72 determines whether the state in which the intake air amount Ga is less than the lower limit intake air amount Ga1 or greater than the upper limit intake air amount Ga2 (S320: NO) has changed to a state in which the intake air amount Ga is greater than or equal to the lower limit intake air amount Ga1 and less than or equal to the upper limit intake air amount Ga2 (S380). When the state in which the intake air amount Ga is less than the lower limit intake air amount Ga1 or greater than the upper limit intake air amount Ga2 (S320: NO) has changed to the state in which the intake air amount Ga is greater than or equal to the lower limit intake air amount Ga1 and less than or equal to the upper limit intake air amount Ga2 (S380: YES), the CPU 72 sets the one of the cylinders in the first cylinder group that has the smallest fuel supplied frequency C'mn (m=1, 2), which is stored in the storage device 75, as the cutoff cylinder (S340). When the state in which the intake air amount Ga is less than the lower limit intake air amount Ga1 or greater than the upper limit intake air amount Ga2 (S320: NO) has not changed to the state in which the intake air amount Ga is greater than or equal to the lower limit intake air amount Ga1 and less than or equal to the upper limit intake air amount Ga2, (S380: NO) or when the intake air amount Ga in S320 is greater than or equal to the lower limit intake air amount Ga1 and less than or equal to the upper limit intake air amount Ga2, (S380: NO), the CPU 72 determines whether ten fuel supply cycles have been completed during twenty rotations of the internal combustion engine 10 (S390).

When ten fuel supply cycles have not been completed (S390: NO), the CPU 72 repeatedly performs S350 to S380. When ten fuel supply cycles have been completed (S390: YES), the CPU 72 ends the process shown in FIG. 5.

The operation and advantages of the present embodiment will now be described.

When the intake air amount Ga is greater than or equal to the lower limit intake air amount Ga1 and less than or equal to the upper limit intake air amount Ga2, the CPU 72 sets the one of the cylinders in the first cylinder group that has the largest fuel supplied frequency C'mn (m=1, 2) as the cutoff cylinder. This reduces differences in the fuel supplied frequency between the cylinders of the first cylinder group.

When the intake air amount Ga is not greater than or equal to the lower limit intake air amount Ga1 and less than or equal to the upper limit intake air amount Ga2, the CPU 72 sets the one of the cylinders that has the largest fuel supplied frequency C'inn (in =1 to 4) as the cylinder to which the supply of fuel will be cut off. This reduces differences in the fuel supplied frequency between cylinders.

Correspondence

The correspondence between the elements in the above embodiments and the elements described in the claims is as follows. The upstream air-fuel ratio sensor 88 corresponds to an exhaust sensor. The CPU 72 corresponds to an execution device. The intake air amount Ga corresponds to an index value of an intake air amount. The process in S120 to S190 of FIG. 2 and S320 to S390 of FIG. 5 corresponds to a specific cylinder fuel cutoff process. The process in S240, S250, S260, S265 of FIG. 3 corresponds to an anomaly determination process. The process in S140, S145 of FIG. 2 and S340, S345 of FIG. 5 corresponds to a cutoff cylinder selection process. The process in S130, S135 of FIG. 2 and S330, S335 of FIG. 5 corresponds to an operation condition changing process.

Other Embodiments

The followings are modifications commonly applicable to the above embodiments. The modifications can be combined as long as the combined modifications remain technically consistent with each other.

Exhaust Sensor

The upstream air-fuel ratio sensor 88 does not need to correspond to the exhaust sensor. For example, an oxygen sensor may be the exhaust sensor.

Index Value of the Intake Air Amount

The intake air amount Ga does not need to correspond to an index value of the intake air amount. For example, the engine rotation speed NE or the charging efficiency η may be an index value of the intake air amount.

First Cylinder Group and Second Cylinder Group

The first cylinder group includes cylinder #1 and cylinder #2, and the second cylinder group includes cylinder #3 and cylinder #4. Instead, when, for example, the upstream air-fuel ratio sensor 88 obtains a large detection value from only cylinder #3, the first cylinder group may include only cylinder #3, and the second cylinder group may include cylinder #1, cylinder #2, and cylinder #4. Alternatively, when the upstream air-fuel ratio sensor 88 obtains large detection values from cylinder #1, cylinder #2, and cylinder #3, the first cylinder group may include cylinder #1 to cylinder #3, and the second cylinder group may include cylinder #4.

Predetermined Range

A predetermined range is set to be greater than or equal to the lower limit intake air amount Ga1 and less than or equal to the upper limit intake air amount Gat. Instead, when the upstream air-fuel ratio sensor 88 obtains a larger detection value from the first cylinder group than the second cylinder group, the predetermined range may be greater than or equal to the lower limit intake air amount Ga1. Alternatively, when the upstream air-fuel ratio sensor 88 obtains a larger detection value from the first cylinder group than the second cylinder group, the larger detection value being less than or equal to the upper limit intake air amount Ga2, the predetermined range may be less than or equal to the upper limit intake air amount Ga2.

The predetermined range is set based on the intake air amount. Instead, the predetermined range may be set based on the engine rotation speed NE or charging efficiency η.

S190, S390

The determination of whether ten fuel supply cycles have been completed is performed in S190 and S390. However, the number of cycles is not limited, and any number of cycles may be used as long as the downstream air-fuel ratio AFr is lean enough after fuel cutoff has been continued for the predetermined number of cycles.

Comparison Between Upstream Air-Fuel Ratio AFf and Determination Value AF0

The maximum air-fuel ratio AFmax, which is the maximum value of the upstream air-fuel ratio AFf, is compared with the determination value AF0. Instead, an integrated value ΣAF of detection values of the upstream air-fuel ratio sensor 88 after the first predetermined period elapses from the time at which the exhaust valve 28 of the cutoff cylinder opens until the second predetermined period elapses may be compared with a determination value AF0'. When the integrated value ΣAF is greater than the determination value AF0', the cutoff cylinder may be determined as being normal. When the integrated value ΣAF is less than or equal to the determination value AF0', the cutoff cylinder may be determined as being anomalous.

The first predetermined period and the second predetermined period are set to periods elapsed from the time at which the exhaust valve 28 of the cutoff cylinder opens. Instead, the first predetermined period and the second predetermined period may be set to periods from when the exhaust valve 28 of the cutoff cylinder opens during which the crank angle shifts to a first crank angle and a second crank angle.

Specific Cylinder Fuel Cutoff Process

The air-fuel ratio of an air-fuel mixture in combustion cylinders does not need to be the stoichiometric value. Instead, the air-fuel ratio of the air-fuel mixture in the combustion cylinders may be lean or slightly rich as long as the total air-fuel ratio of the cutoff cylinder and the combustion cylinders is lean.

The specific cylinder fuel cutoff process does not need to start in the case of the air-fuel ratio AFr≤specific cylinder fuel cutoff execution value AF1. For example, the specific cylinder fuel cutoff may be performed when the estimated amount of deposition on the GPF 34 is greater than or equal to a predetermined value. In this case, the air-fuel ratio may be rich in the combustion cylinders. Further, the amount of deposition may be estimated based on the difference of pressure between the upstream side and the downstream side of the GPF 34 and the intake air amount Ga. Alternatively, the amount of deposition may be calculated based on the rotation speed NE, the charging efficiency and the coolant temperature THW.

Controller

The controller is not limited to a device that includes the CPU 72 and the ROM 74 and executes software processing. For example, at least part of the processes executed by the software in the above-illustrated embodiment may be executed by hardware circuits such as ASIC dedicated to executing these processes. That is, the controller may be modified as long as it has any one of the following configurations (a) to (c). (a) A configuration including a processor that executes all of the above-described processes according to programs and a program storage device such as ROM that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software executing devices each including a processor and a program storage device and a plurality of dedicated hardware circuits may be provided.

Vehicle

The vehicle is not limited to a series-parallel hybrid vehicle. For example, a parallel hybrid vehicle or a series hybrid vehicle may be used. Further, instead of a hybrid vehicle, a vehicle including only the internal combustion engine 10 as a drive force generator may be used.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a multi-cylinder internal combustion engine, the multi-cylinder internal combustion engine including an exhaust sensor that detects oxygen and is arranged at an upstream side of a catalyst in an exhaust passage, a first cylinder group including one or more cylinders, and a second cylinder group including one or more cylinders, wherein when an index value corresponding to an intake air amount for the engine is in a predetermined range, with the index value including an engine rotation speed or a charging efficiency, a detection value of the exhaust sensor for oxygen discharged from a cylinder included in the first cylinder group is greater than a detection value of the exhaust sensor for oxygen discharged from a cylinder included in the second cylinder group, the controller comprising:

an execution device, wherein the execution device is configured to perform:

a specific cylinder fuel cutoff process for performing specific cylinder fuel cutoff control to cut off a supply of fuel to one of cylinders of the multi-cylinder internal combustion engine and supply fuel to the cylinders other than the one cylinder; and an anomaly determination process for determining whether a cutoff cylinder to which the supply of fuel is cut off is anomalous based on a detection value of the exhaust sensor indicative of an air-fuel ratio that is greater than a predetermined value when the fuel cutoff is normal and less than or equal to the predetermined value when the fuel cutoff is anomalous, and the specific cylinder fuel cutoff process includes a cutoff cylinder selection process for setting one cylinder of the first cylinder group as the cutoff cylinder, wherein an intake valve and an exhaust valve of the cutoff cylinder open and close in the same manner while the supply of fuel to the cutoff cylinder is cut off as when fuel is supplied to the cutoff cylinder.

2. The controller according to claim 1, wherein the first cylinder group includes two or more cylinders, and the cutoff cylinder selection process selects an injection-stopped cylinder to which the supply of fuel is cut off from supply history information allowing for recognition of a relationship in a fuel supplied frequency of each of the cylinders included in the first cylinder group so as to reduce a difference in the fuel supplied frequency in the first cylinder group.

3. The controller according to claim 2, wherein the cutoff cylinder selection process calculates a cutoff frequency of each of the cylinders included in the first cylinder group as the supply history information and sets one of the cylinders having a smallest cutoff frequency as the cutoff cylinder.

4. The controller according to claim 2, wherein the cutoff cylinder selection process calculates a fuel supplied frequency of each of the cylinders included in the first cylinder group as the supply history information and sets one of the cylinders having a largest fuel supplied frequency as the cutoff cylinder.

5. The controller according to claim 1, wherein when the index value corresponding to the intake air amount is in the predetermined range, the cutoff cylinder selection process sets one cylinder of the first cylinder group as the cutoff cylinder.

6. The controller according to claim 5, wherein when the index value corresponding to the intake air amount is outside the predetermined range, the cutoff cylinder selection process selects the cutoff cylinder based on supply history information allowing for recognition of a relationship in a fuel supplied frequency of each of the cylinders so as to reduce differences in the fuel supplied frequency of the cylinders included in the first cylinder group and the second cylinder group.

7. The controller according to claim 5, wherein the execution device is configured to perform an operation condition changing process for changing an operation condition of the multi-cylinder internal combustion engine when the index value corresponding to the intake air amount has been in the predetermined range over a predetermined period so that the index value corresponding to the intake air amount goes outside the predetermined range.

8. A controller for a multi-cylinder internal combustion engine, the multi-cylinder internal combustion engine including an exhaust sensor that detects oxygen and is arranged at an upstream side of a catalyst in an exhaust passage, a first cylinder group including one or more cylinders, and a second cylinder group including one or more cylinders, wherein when an index value corresponding to an intake air amount for the engine is in a predetermined range, with the index value including an engine rotation speed or a charging efficiency, a detection value of the exhaust sensor for oxygen discharged from a cylinder included in the first cylinder group is greater than a detection value of the exhaust sensor for oxygen discharged from a cylinder included in the second cylinder group, the controller comprising:

an execution device including circuitry, wherein the execution device is configured to perform:

a specific cylinder fuel cutoff process for performing specific cylinder fuel cutoff control to cut off a supply of fuel to one of cylinders of the multi-cylinder internal combustion engine and supply fuel to the cylinders other than the one cylinder; and an anomaly determination process for determining whether a cutoff cylinder to which the supply of fuel is cut off is anomalous based on a detection value of the exhaust sensor indicative of an air-fuel ratio that is greater than a predetermined value when the fuel cutoff is normal and less than or equal to the predetermined value when the fuel cutoff is anomalous, and the specific cylinder fuel cutoff process includes a cutoff cylinder selection process for setting one cylinder of the first cylinder group as the cutoff cylinder, wherein an intake valve and an exhaust valve of the cutoff cylinder open and close in the same manner while the supply of fuel to the cutoff cylinder is cut off as when fuel is supplied to the cutoff cylinder.

9. A method for controlling a multi-cylinder internal combustion engine, the multi-cylinder internal combustion engine including an exhaust sensor that detects oxygen and is arranged at an upstream side of a catalyst in an exhaust passage, a first cylinder group including one or more cylinders, a second cylinder group including one or more cylinders, wherein when an index value corresponding to an intake air amount for the engine is in a predetermined range, with the index value including an engine rotation speed or a charging efficiency, a detection value of the exhaust sensor for oxygen discharged from a cylinder included in the first cylinder group is greater than a detection value of the exhaust sensor for oxygen discharged from a cylinder included in the second cylinder group, and an execution device, the method comprising:

performing a specific cylinder fuel cutoff process for performing specific cylinder fuel cutoff control to cut off a supply of fuel to one of cylinders of the multi-cylinder internal combustion engine and supply fuel to the cylinders other than the one cylinder; and performing an anomaly determination process for determining whether a cutoff cylinder to which the supply of fuel is cut off is anomalous based on a detection value of the exhaust sensor indicative of an air-fuel ratio that is greater than a predetermined value when the fuel cutoff is normal and less than or equal to the predetermined value when the fuel cutoff is anomalous, wherein the specific cylinder fuel cutoff process includes a cutoff cylinder selection process for setting one cylinder of the first cylinder group as the cutoff cylinder, wherein an intake valve and an exhaust valve of the cutoff cylinder open and close in the same manner while the supply of fuel to the cutoff cylinder is cut off as when fuel is supplied to the cutoff cylinder.

* * * * *